United States Patent [19]

Keledy et al.

[11] 4,010,708
[45] Mar. 8, 1977

[54] DIFFERENTIAL PRESSURE INDICATOR INCLUDING REMOTE SENSING MEANS

[75] Inventors: Francis C. Keledy, Butler; Laszlo Nemes, West New York, both of N.J.

[73] Assignee: Trodyne Corporation, Teterboro, N.J.

[22] Filed: Dec. 2, 1975

[21] Appl. No.: 637,031

[52] U.S. Cl. .................................. 116/65; 116/70; 116/114 PV; 250/303

[51] Int. Cl.² .......................................... G08B 1/00

[58] Field of Search .... 116/65, 70, 124 A, 114 AC, 116/114 Q, 114 R, 114 AE, 114 PV; 73/410, 38; 250/303, 302

[56] References Cited

UNITED STATES PATENTS

| | | | |
|---|---|---|---|
| 1,289,712 | 12/1918 | Evans | 73/410 |
| 1,950,107 | 3/1934 | Guinn | 73/410 |
| 2,843,077 | 7/1958 | Leefer | 73/38 |
| 3,154,049 | 10/1964 | Smith | 73/38 |
| 3,221,703 | 12/1965 | Kalustyan | 116/114 PV |
| 3,269,186 | 8/1966 | Hebenstreit | 73/410 |
| 3,417,727 | 12/1968 | Nemes | 73/388 R |
| 3,677,218 | 2/1971 | Dixon | 116/114 PV |
| 3,985,318 | 10/1976 | Dominey | 116/70 |

*Primary Examiner*—S. Clement Swisher
*Assistant Examiner*—Denis E. Corr
*Attorney, Agent, or Firm*—Hopgood, Calimafde, Kalil, Blaustein & Lieberman

[57] ABSTRACT

A differential pressure indicator including a remote sensing means is disclosed wherein a reference volume under predetermined pressure is employed as a standard, triggering an indicating mechanism when a second (measured) pressure falls above or below a predetermined threshold. The indicating mechanism may include a novel shaft which protrudes through the casing carrying thereon a source of radioactive material which is remotely monitored. Alternatively, the protrusion may be sensed as an impedance variation or additional visual indicator. In one embodiment, a plurality of the subject sensors are housed upon the blades of a helicopter. Upon sensing the changing pressure in the helicopter blade, the protruding element provides a radioactive source which is sensed in a conventional manner to provide a cockpit readout.

5 Claims, 5 Drawing Figures

DIFFERENTIAL PRESSURE INDICATOR INCLUDING REMOTE SENSING MEANS

BACKGROUND OF THE INVENTION

The present invention relates generally to a parameter monitoring system and more particularly to a remote monitoring system and indicator by means of which an inaccessible fault can be quickly sensed and identified.

It is often essential for parameters such as pressure, temperature or the like to be continuously monitored at inaccessible locations, and a warning be quickly provided when the monitored parameter has varied beyond a preselected range. The problem is particularly complex in situations where electric power cannot be conveniently provided to the remote location.

A typical application, and one in which the present invention will be illustrated, is a helicopter in which the structural integrity of the blades must be continuously monitored; it having been found that a crack in a blade spar if not detected will quickly result in deterioration of structural integrity (fatigue) and eventually the inability of the aircraft to maintain altitude. It is desirable, if not essential, to be able to detect crack development long before blade failure, to permit replacement or repair.

For these reasons helicopters are frequently provided with a variety of preflight and postflight blade structural integrity monitoring systems for inspection by the helicopter pilot during static conditions (blades at rest). In such systems the blade spar is hollow and a predetermined pressure (above or below ambient) is sealed in the blade cavity. In known monitoring systems, a differential sensing the visual indicator, such as that disclosed in U.S. Pat. No. 3,417,727 (to this assignee) is incorporated in the blade systems. Upon occurrence of a fissure in the spar, the pressure is altered and the change sensed to provide a visual indication. While devices of this type are highly reliable in sensing and indicating the existence of a developing crack, such apparatus is limited to static environments (when the blade is at rest). However, longer flight requirements for helicopters and greater helicopter loads have necessitated systems which can monitor blades in flight and under load so that a real time observation may be afforded the pilot. Such systems are fraught with problems. The most significant of which is the sensing of the fault within the cockpit confines. The use of slip rings to transmit such faults to the cockpit is both expensive and unreliable.

One such arrangement is described in U.S. Pat. No. 3,739,376 (to this assignee) wherein the differential pressure sensor activates a passive element (tuned circuit) housed in the blades of the helicopter which element is electromagnetically coupled to an active unit in a more accessible location. While such an arrangement accomplishes its objectives, it requires modification to the helicopter blade and rotor which is sometimes undesirable.

It is, therefore, an object of this invention to provide a remote monitoring system in which parameters such as pressure can be accurately sensed at relatively inaccessible locations with little to no modification of the apparatus in which it is being used.

It is another object of this invention to provide a monitoring system in which no energy need be supplied to the parameter sensing unit, as for example where the parameter to be sensed is in a remote and inaccessible environment, in particular a helicopter rotor blade.

It is a further object of this invention to provide a remote parameter monitoring system for helicopters which is capable of operating through a single blade port with an indicator not too different than that disclosed in U.S. Pat. No. 3,417,727, a conventional, reliable and widely used indicator.

It is a further and specific object of this invention to provide a remote pressure sensing and monitoring system for use in a vehicle in which the occurrence of a potentially dangerous pressure change, such as in a helicopter rotor blade, can be quickly observed by the operator of the vehicle while the vehicle or its monitored parts are operating under load or are in motion.

It is still a further object of this invention to provide such a remote pressure sensing and monitoring system as will satisfy the foregoing objects with snap or trigger action. That is, may employ a mechanical amplifier to utilize a small mechanical trigger to activate a larger force.

SUMMARY OF THE INVENTION

The present invention contemplates the utilization of a proven pressure differential indicator modified to house a shaft protruding through the indicator to provide an indication of pressure change which can be remotely sensed. When the value of the sensing parameters changes above or below a predetermined threshold, a reference pressure is employed to trigger the shaft. In the embodiment described the shaft would carry a radioactive source which is normally shielded to ambient. Upon protrusion of the shaft end, the radiation is sensed by conventional means on a stationary part of the helicopter body and transmitted to the cockpit. An indicator advises the pilot of blade fatigue. Such an arrangement of indicator shaft protrusion may also be employed to trigger an impedance sensitive or antenna sensitive circuit, the shaft, for example, acting as a dipole above ground and the reflection therefrom being noted in a conventional manner by a transceiver in the aircraft. For night flights, the shaft may include the provision of a phosphorescent source to give a visual indication to the pilot.

The above mentioned and other features and objects of this invention and the manner of attaining them will become more apparent and the invention itself will best be understood by reference to the following description of embodiments of the invention taken in conjunction with the accompanying drawings, the description of which follows.

IN THE DRAWINGS

Because this invention is a modification of the device described in U.S. Pat. No. 3,417,727, reference may be made to such patent for details not included herein and emphasis will be placed upon the modified portions to illustrate the invention.

Figure 1:
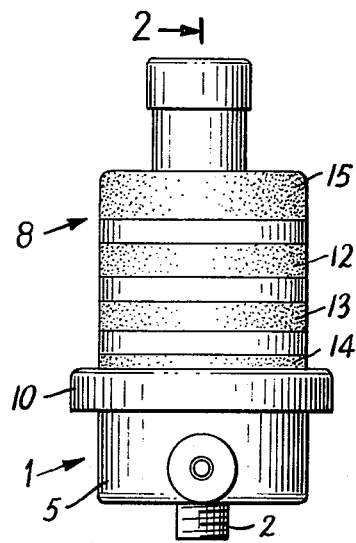
FIG. 1 is an elevated view of the assembled differential pressure indicator showing the appearance under normal operating conditions.
Figure 3:
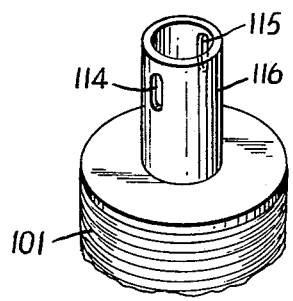
FIG. 3 is a detail of the indicator of FIGS. 1 and 2 showing the trigger sleeve affixed to the reference volume or bellows.
Figure 2:
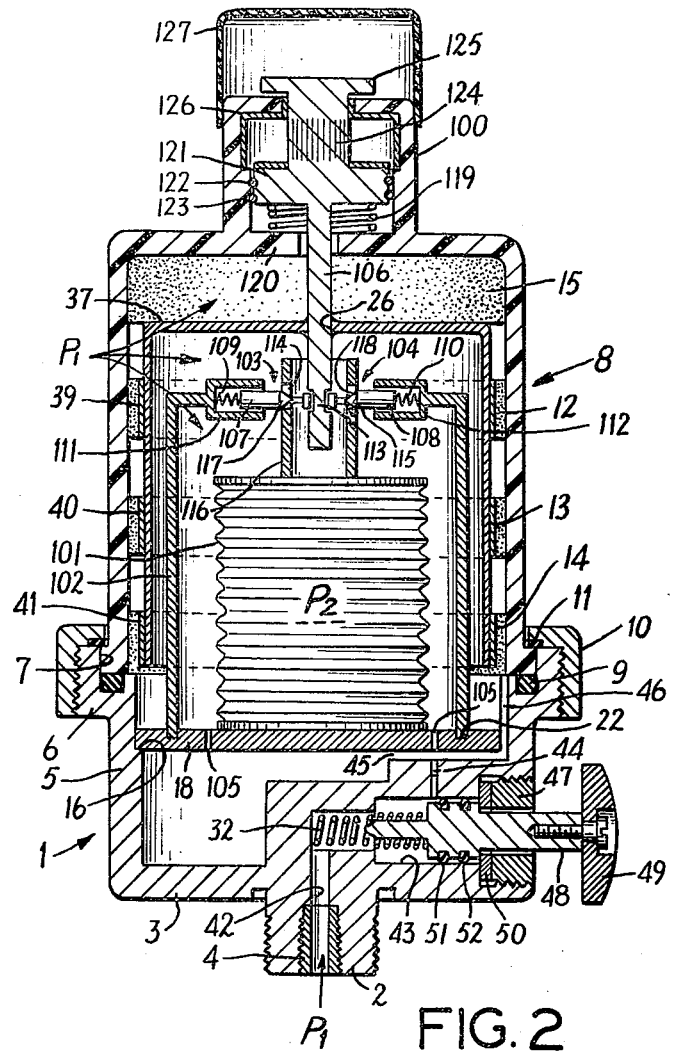
FIG. 2 is a vertical section taken in a plane indicated by line 2.2 in FIG. 1 showing the position of parts under normal operating conditions.

Referring now to the drawings and in particular to FIG. 1 through 3, a base cup 1 includes a pressure connection or nipple 2 extending centrally from its generally circular base or bottom wall 3. A soft metal insert sleeve 4 assures pressure tight connection with the pressurized system, not shown. The cup includes a side wall 5 and an outwardly-flanged threaded rim 6. The upwardly-facing rim portion of cup 1 is counterbored at 7 to form a circular channel. Inverted cap 8 is of a transparent shatter-proof material, such as LEXAN, and has its lower end outwardly flanged and sized for a smooth fit within the counterbore of the flange of cup 1. An O-ring 9 rests in the aforesaid channel and is compressed to effect a pressure-tight seal between the cup and cap, when flanged ring 10 is turned down on the threads of rim 6. A washer 11 seats in a groove in the inner surface of the flange of the ring 10 and assures that the flanged rim of the cap compresses O-ring 9.

Cap 8 is generally cylindrical and includes a thimble portion 100 at the top thereof also of a material such as LEXAN. The inside surface of cap 8 may carry (as shown) a number of axially-spaced indicator rings 12, 13, 14. These rings or bands may be formed in any suitable way, as by adhesive strips of material, paint, or sandblasting the inside or outside surface of the cap to render the ring areas translucent or pellucid, in contrast with the areas interposed between the rings which are preferably clear. Likewise the top end wall of the cap and areas adjacent thereto may be similarly colored or roughened as indicated at 15.

Adjacent the top of its inner wall, cup 1 is formed with an upwardly-facing circular shoulder 16. The circular metallic base plate 18 of the capsule is sized for a smooth fit to rest upon shoulder 16 and to which it is attached by means of screws, brazing, welding or soldering. Plate 18 has affixed to its upper surface bellows 101 carrying a reference volume at a predetermined pressure. Plate 18 is provided on its upper surface, concentrically with and external to bellows 101, a circular channel 22 receiving cup shaped support member 102 with a snug fit. The two are secured together in a pressure tight joint as by soldering, brazing or welding. At its top, support member 102 includes a pair of trigger members 103 and 104 to be described. Base plate 18 is further provided with a series of apertures 105 for passing the sensed pressure to the internal chambers of the device (see generally arrows P1).

The indicator is pressurized with a suitable gas through openings 105 in plate 18 which in turn receive their pressure through channel 44 which communicate with radial bores 43 and 42. In the described arrangement, the interior of the bellows is subjected to the standard or reference pressure, while the exterior thereof is subjected to that of the pressurized system such as that of the hollow rotor blades of a helicopter.

Figure 4:
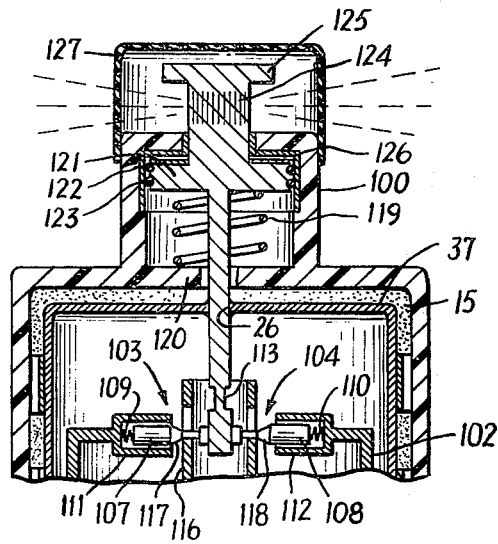
FIG. 4 is a sectional view corresponding to FIG. 2 showing a detail of the parts in the positions that they assume upon the occurrence of a fault.

As explained in U.S. Pat. No. 3,417,727, it is sometimes desirable to be able to test the instrument periodically to assure that it is operating properly. For this purpose radial bore 43 is counterbored and threaded at its outward end, to receive a gland nut 47 centrally drilled to accommodate with clearance, a valve stem 48 having knob 49 detachably fixed to its exposed end. A washer 50 is interposed about the stem, between nut 47 and the shoulder formed by the counterbore of bore 43. Within the bore, stem 48 is cylindrically enlarged and circumferentially grooved to form two axially-spaced channels for seating respective O-rings 51, 52 and forming with the wall of the bore a seal against the escape to ambient air, of gas within the pressurized blade system when the stem is urged to position shown in FIG. 2. For this purpose a coil spring 32 extends between the inner reduced end of the stem and the end of the bore, in a way clear from inspection of FIG. 2. When the stem is manually pressed inwardly, that is, to the left as seen in FIG. 2, until the reduced end of the stem abuts the end of the bore, the O-rings are located at the left of passage 44. Thereby, communication between the pressurized system and the exterior of the bellows is cut off and connection made with the atmosphere through channels 46, 45, passage 44 and about the reduced outer end of stem 48. Assuming that the instrument is operating properly and that the rotor system is at proper gauge pressure movement of the valve stem 48 aforesaid releases or increases pressure about bellows 101. The confined gas within the bellows then expands or contracts from the positions shown in FIGS. 1 through 3 to trigger a new position as shown in FIG. 4 in a manner to be described, thereby affording a positive indication that the instrument is in proper working order. When force is removed from knob 49, spring 51 restores parts to the position shown wherein the instrument is cut off from atmosphere and reconnected with the pressurized rotor system. The system may be then reset in a manner to be described.

The foregoing has described, although with some variation, the invention of U.S. Pat. No. 3,417,727. We turn our attention now to the novelty herein.

Shaft 106 carries between its ends the inverted cylindrical indicator 37 carrying colored bands 39, 40 and 41 which is soldered, brazed or welded to the shaft 106 to assure a firm coupling. The cylindrical indicator will, in accordance with the invention, carry out the usual function in the manner described in U.S. Pat. No. 3,417,727, of indicating blade fatigue or failure. While in accordance with the invention such an indication will be given under both static and dynamic conditions it should be noted that the indication is not readily observable when the helicopter blades are rotating.

Shaft 106 is fixed in position under normal operating conditions by pins 107 and 108 which are normally urged inwardly by springs 109 and 110 respectively.

The spring and pin arrangements are housed within the cup shaped sleeves 111 and 112 in a manner akin to brushes in a motor. As may be seen from FIG. 2, the normal urging of the springs 109 and 110 maintain pins 107 and 108 in contact with the reduced shaft portion 113 preventing any vertical displacement.

Pins 107 and 108 pass through apertures 114 and 115 of sleeve 116 (see FIG. 3) which are elongated and dimensioned vertically dependent upon the critical pressure differential desired. That is, dependent upon the vertical displacement of bellows 101 upon predetermined pressure variation. Because the bellows 101 displacements depend upon a variety of factors including internal volume, diameter, height, resiliency of the material of which it is made, internal and external pressures, no precise formula for the length of apertures 114, 115 may be easily derived. We have found that such length is best determined empirically and then by careful quality control during manufacturing as will be apparent to those skilled in the art. Sleeve 116 is mounted on the upper portion of the bellows 101 by soldering, brazing or welding.

As will be apparent from viewing the figures, bellows displacement either upwardly or downwardly causes sleeve 116 to contact camming surfaces 117 and 118 on pins 107 and 108 respectively, driving the pins outwardly and releasing shaft 106.

It is a feature of this invention that regardless of whether the monitored pressure is positive or negative vis-a-vis the standard bellows pressure beyond any change in blade pressure a predetermined limit will trigger the indicator. Upon being triggered spring 119, which rests at one end upon shoulder 120 of cap 8 and at the other end upon the flange 121 of shaft 106, urges shaft 106 upwardly to the position shown in FIG. 4 while the internal shaft end slides along pins 107 and 108. The pressure imparted by spring 119 will be generally determined by the force to be overcome during blade rotation, as reduced by the vibrations of the blade (which aid movement). Thimble portion 100 of the cap 8 is either formed of LEXAN or integral with the Cap 8 or may be a separate portion threaded onto the LEXAN cap (not shown). Any arrangement which will maintain the hermetic seal of this cap portion and fulfill the other function requisites (weather, strength, etc.) under centrifugal force would be suitable.

As will be apparent under the arrangement shown, the small force imparted by bellows 101 triggers a large force of the spring to assure activation of the instrument.

As will be apparent under the arrangement shown, the indicator cup 37 is affixed between the bearing points formed by pins 107 and 108 at one end and O-rings 122 and 123 (mounted similarly to O-rings 51, 52) at the other end, thereby assuring that the centrifugal force of the rotating blade does not act to skew shaft 106.

The extreme outer end of shaft 106 includes shaft portion 124 124 reset button 125. Upon triggering, shaft portion 124 protrudes through thimble 100. In the embodiment described shaft portion 124 includes thereon a thin Beta-source layer. In the untriggered position, the Beta-source layer is shielded by any suitable medium, such as e.g. lead or cadmium or copper 126, affixed to the internal surface of thimble 100 and the upper surface of flange 121.

It has been found that it is only necessary for each instrument to contain a very small radioactive source whose exposure dose is negligible in the untriggered position and when activated is less than 10, preferably 1, mR/hr at 3 feet. This dose rate is small enough so that personnel need not wear film badges even if the instruments were in the triggered position continuously and yet is sufficient to be measurable by a radiation detector within 5 feet.

Reset button 125 is employed in both testing and operating conditions to reset the instrument when pressure P1 has re-attained suitable limits. Covering the reset button is a thin film of for example Silicon rubber 127 molded to the LEXAN thimble for environmental protection. Such a film offers little radiation resistance to Beta sources.

Figure 5:
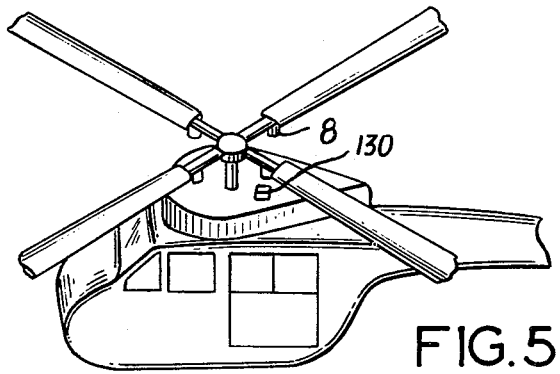
FIG. 5 illustrates the system arrangement on a conventional helicopter.

It is contemplated that a radiation detector 130 be mounted as shown in FIG. 5 below the rotating blades on a static portion of the helicopter in such a manner that the indicators of the invention will pass over such detectors seriatim, during rotation. Upon sensing radiation, the detector will emanate a signal and in the conventional manner trigger a suitable visual indication within the cockpit. Since the latter arrangements are completely conventional or easily adaptable by one skilled in the art, no detailed explanation is given, such arrangements being replete in the radiation detection field.

The arrangement disclosed above employing a hermetically sealed chamber through which a shaft protrudes upon a fault permits several variations in the mechanism of detection as is apparent to those skilled in the art. For example, as is well known in the electronic art, it is possible to utilize a transmitter located similarly to the disclosed detector with an adjunct receiver similarly located. The shaft and protruding shaft portion could be utilized as a dipole, the reflection therefrom triggering the receiver to an alarm in the cockpit. Similarly for visual indication, the protruding shaft portion may be of a phosphorescent source for a visual indication.

While the principles of the invention have been described in connection with specific apparatus, it is to be clearly understood that this description is made only by way of example and not as a limitation to the scope of the invention. For example, while the particular invention employs shaft penetration of the casing to expose an end thereof, it will be readily apparent that by "exposed" is meant permitting escape of the radiation to ambient which could be accomplished through a variety of means, including a window in the casing itself; the window being of reduced thickness or different material to thereby be radiation permeable.

What is claimed is:

1. A pressure responsive indicator comprising a pressure tight casing including means for connecting the interior of said casing in fluid pressure communication with a closed system to be monitored;
   the improvement comprising
   closed bellows means mounted within said casing under predetermined pressure;
   a shaft reciprocally mounted in said casing for rectilinear motion between exposed and retracted positions;
   means for biasing said shaft to the exposed position;
   releasable means for maintaining said shaft in said retracted position;
   means for coupling said shaft and bellows and responsive to a predetermined pressure differential between the pressure in said bellows and said closed system for releasing said shaft to said exposed position;
   wherein said shaft in assuming said exposed position exposes one portion thereof to ambient;
   a source of radiation located at the exposed portion of said shaft; and
   said casing further comprising radiation shield means surrounding said source of radiation when said shaft is in the retracted position.

2. The indicator of claim 1 in which said casing includes a transparent viewing portion, said indicator further comprising means coupled to said shaft to reciprocate therewith including markings thereon viewable through the transparent portion of said casing in only one position of said shaft.

3. The indicator claimed in claim 1 wherein said bias means is a spring.

4. The indicator claimed in claim 3 wherein said releasable means comprises a reduced portion of said shaft; and
   releasable pins normally engaged in said reduced portion.

5. The indicator claimed in claim 4 further comprising means for resetting said indicator.

* * * * *